US012049079B2

(12) United States Patent
Yamaguchi

(10) Patent No.: US 12,049,079 B2
(45) Date of Patent: Jul. 30, 2024

(54) RECORDING APPARATUS

(71) Applicant: BROTHER KOGYO KABUSHIKI KAISHA, Nagoya (JP)

(72) Inventor: Masatomo Yamaguchi, Inazawa (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/897,379

(22) Filed: Aug. 29, 2022

(65) Prior Publication Data

US 2023/0129092 A1 Apr. 27, 2023

Related U.S. Application Data

(63) Continuation of application No. 17/206,345, filed on Mar. 19, 2021, now Pat. No. 11,427,019.

(30) Foreign Application Priority Data

Mar. 31, 2020 (JP) ................................ 2020-063578

(51) Int. Cl.
*B41J 11/70* (2006.01)
*B26D 1/02* (2006.01)
(Continued)

(52) U.S. Cl.
CPC ............... *B41J 11/70* (2013.01); *B26D 1/025* (2013.01); *B26D 1/185* (2013.01); *B41J 13/08* (2013.01);
(Continued)

(58) Field of Classification Search
CPC ... B41J 11/70; B41J 13/08; B41J 29/13; B41J 29/12; B41J 29/38; B26D 1/025; B26D 1/185; B26D 2001/0066
See application file for complete search history.

(56) References Cited

U.S. PATENT DOCUMENTS 6,343,884 B1 * 2/2002 Watanabe .............. B41J 11/703 400/621
2003/0103793 A1 6/2003 Murakoshi et al.
(Continued)

FOREIGN PATENT DOCUMENTS

JP 2013-208767 A 10/2013
JP 6013096 B2 * 10/2016 ............. B41J 11/42

OTHER PUBLICATIONS

Notice of Allowance dated Apr. 22, 2022 from parent U.S. Appl. No. 17/206,345, filed Mar. 19, 2021.

*Primary Examiner* — Yaovi M Ameh
(74) *Attorney, Agent, or Firm* — Scully, Scott, Murphy & Presser, P.C.

(57) ABSTRACT

A recording apparatus including: an apparatus main body; a conveyance mechanism; a recorder; two first contact portions disposed in different positions in a conveyance direction of the recording medium and contactable with one surface of the recording medium; a cut mechanism configured to cut the recording medium, the cut mechanism being disposed between the two first contact portions and including a first blade, a second blade, and a second contact portion contactable with the other surface of the recording medium; and a cover configured to take an open position and a closed position in which a conveyance path of the recording medium is formed between the cover and the apparatus main body, the cover being formed with a groove, and the first blade being located in the groove when the cover is located in the closed position.

17 Claims, 4 Drawing Sheets

(51) Int. Cl.

| | |
|---|---|
| ***B26D 1/18*** | (2006.01) |
| ***B41J 13/08*** | (2006.01) |
| ***B41J 29/13*** | (2006.01) |
| *B26D 1/00* | (2006.01) |
| *B41J 29/12* | (2006.01) |
| *B41J 29/38* | (2006.01) |

(52) U.S. Cl.
CPC ....... *B41J 29/13* (2013.01); *B26D 2001/0066* (2013.01); *B41J 29/12* (2013.01); *B41J 29/38* (2013.01)

(56) References Cited

U.S. PATENT DOCUMENTS

| | | | | |
|---|---|---|---|---|
| 2009/0279935 | A1 | 11/2009 | Kawaguchi | |
| 2010/0086341 | A1* | 4/2010 | Yokoyama | B26D 1/085 400/621 |
| 2011/0050831 | A1* | 3/2011 | Yamada | B41J 13/14 347/215 |
| 2011/0182647 | A1 | 7/2011 | Kawaguchi | |
| 2017/0217703 | A1 | 8/2017 | Yamaguchi | |

* cited by examiner

RECORDING APPARATUS

CROSS-REFERENCE TO RELATED APPLICATIONS

This application is a continuation application of U.S. Ser. No. 17/206,345 filed on Mar. 19, 2021 which is based on and claims priority under 35 USC 119 from Japanese Patent Application No. 2020-063578 filed on Mar. 31, 2020, the contents of which are incorporated herein by reference.

TECHNICAL FIELD

The present disclosure relates to a recording apparatus including a cut mechanism configured to cut a sheet-like recording medium.

BACKGROUND

A related-art printer configured to perform print processing on a sheet rolled in a roll shape includes a transverse cutting unit capable of cutting the sheet in a width direction of the sheet. The transverse cutting unit includes a fixed blade that is long in the width direction of the sheet, and a movable blade capable of moving in the width direction of the sheet while sandwiching the sheet between the fixed blade and the movable blade in a thickness direction. By scanning the movable blade in the width direction of the sheet with sliding the movable blade on the fixed blade, the sheet is cut in the width direction of the sheet.

SUMMARY

One illustrative aspect of the present disclosure may provide a recording apparatus including: an apparatus main body; a conveyance mechanism mounted to the apparatus main body and configured to convey a sheet-like recording medium; a recorder mounted to the apparatus main body and configured to record an image on the recording medium; two first contact portions disposed in different positions in a conveyance direction of the recording medium, the two first contact portions being contactable with one surface of the recording medium in a case the recording medium is conveyed by the conveyance mechanism; a cut mechanism disposed between the two first contact portions in the conveyance direction, the cut mechanism including: a first blade and a second blade, at least one of the first blade and the second blade being a movable blade; and a second contact portion contactable with the other surface of the recording medium in the case the recording medium is conveyed by the conveyance mechanism, the cut mechanism being configured to cut the recording medium in a direction intersecting with the conveyance direction by the first blade and the second blade being cooperated with each other; and a cover configured to take a closed position and an open position, in a case the cover is in the closed position, the cover forming a conveyance path of the recording medium between the cover and the apparatus main body, and in a case the cover is in the open position, at least a part of the cover being apart from the apparatus main body and the conveyance path being not formed, the cover being formed with a groove in a surface that faces the apparatus main body in the case the cover is located in the closed position, and the first blade being located in the groove of the cover in the case the cover is located in the closed position.

According to the recording apparatus of the present disclosure, since the first blade of the cut mechanism is located in the groove of the cover when the cover is located in the closed position, it is possible to suppress the apparatus from being enlarged. Also, the cut mechanism is disposed between the two first contact portions that can contact one surface of the recording medium, and has the second contact portion that can contact the other surface of the recording medium. That is, the cut mechanism can cut the recording medium in a state where the recording medium is supported at three places by the two first contact portions that can contact one surface of the recording medium and the second contact portion that can contact the other surface of the recording medium between the two first contact portions. Therefore, the recording medium is difficult to escape during the cutting, so that it is possible to appropriately cut the recording medium.

Another illustrative aspect of the present disclosure may provide A recording apparatus including: an apparatus main body; a conveyance mechanism mounted to the apparatus main body and configured to convey a sheet-like recording medium in a conveyance direction; a recorder mounted to the apparatus main body and configured to record an image on the recording medium; a cut mechanism disposed on an upstream side with respect to the recorder in the conveyance direction, the cut mechanism including: a first blade and a second blade, at least one of the first blade and the second blade being a movable blade; and a contact portion contactable with a first surface of the recording medium in a case the recording medium is conveyed by the conveyance mechanism, the cut mechanism being configured to cut the recording medium in a first direction intersecting with the conveyance direction by the first blade and the second blade being cooperated with each other; and a cover configured to take an open position and a closed position and to form a conveyance path of the recording medium between the cover and the apparatus main body in a case the cover is in the closed position, the cover including: a first rib protruding toward the conveyance path and having a first tip end portion; a second rib protruding toward the conveyance path and having a second tip end portion; and a groove formed between the first rib and the second rib in a second direction when viewed from the first direction, the second direction being perpendicular to the first direction, in a case the cover is in the closed position, at least one of the first tip end portion or the second tip end portion being contactable with a second surface of the recording medium conveyed by the conveyance mechanism in the case the recording medium is conveyed by the conveyance mechanism, the second surface being opposite to the first surface, and at least a part of the first blade being overlapped with the groove in the second direction when viewed from the first direction.

BRIEF DESCRIPTION OF DRAWINGS

Illustrative aspects of the invention will be described in detail with reference to the following figures wherein.

DETAILED DESCRIPTION

In a case a recording apparatus is provided with the above-described cut mechanism (transverse cutting device), a product becomes enlarged. Also, when cutting a sheet such as a thin sheet whose stiffness is low, the sheet may escape, so that the above-described cut mechanism may not normally cut the sheet.

Therefore, illustrative aspects of the present disclosure provide a recording apparatus including a cut mechanism capable of suppressing the apparatus from being enlarged and appropriately cutting a recording medium.

Hereinbelow, an inkjet printer (hereinbelow, simply referred to as "printer") in accordance with a favorable illustrative embodiment of the present disclosure will be described with reference to the drawings. In descriptions below, an upper and lower direction is defined on the basis of a state (a state shown in FIG. 1) in which the printer 1 is usably equipped, a front and rear direction is defined in a state where a side on which an opening 13 of a housing 11 is provided is set as a front side (front or forward) and a side on which an opening 14 is provided set as an inner side (back or rearward), and a right and left direction is defined, when the printer 1 is seen from the front side.

Figure 1:
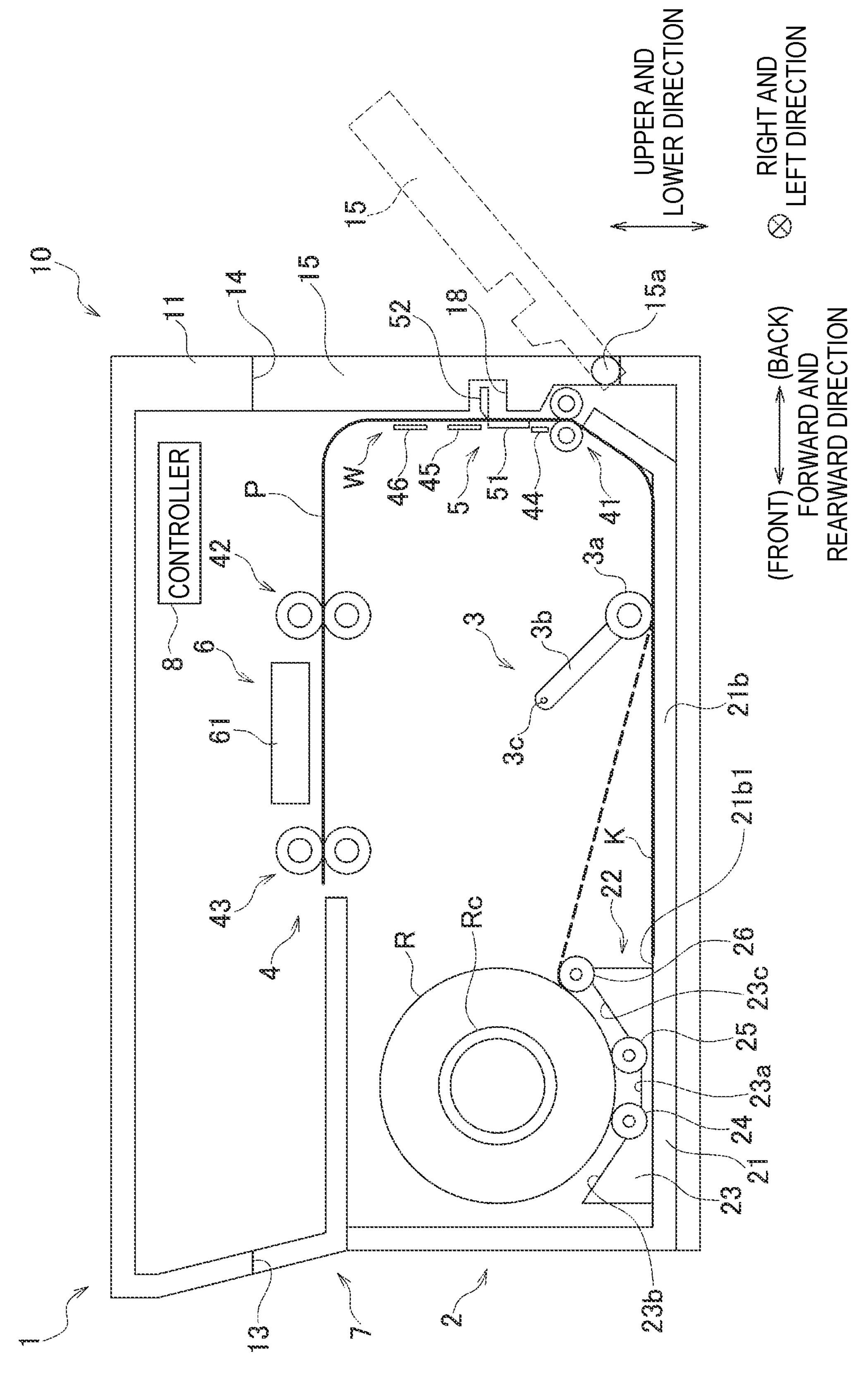
FIG. 1 is a side view depicting a schematic configuration of a printer in accordance with an illustrative embodiment of the present disclosure.

As shown in FIG. 1, the printer 1 includes a feeding cassette 2, a feeder 3, a conveyance mechanism 4, a cut mechanism 5, a recorder 6, a discharge tray 7, a controller 8, a housing 11, a shoot cover 15 and the like. In descriptions below, the housing 11, and the feeding cassette 2, the feeder 3, the conveyance mechanism 4, the cut mechanism 5, the recorder 6, the discharge tray 7 and the controller 8 accommodated in the housing 11 are referred to as an apparatus main body 10.

The shoot cover 15 is disposed in an opening 14 provided on a back side of the housing 11. A lower end portion of the shoot cover 15 is rotatably supported by a shaft 15*a* supported to the housing 11. The shaft 15*a* extends in the right and left direction (a direction orthogonal to the drawing sheet of FIG. 1). The shoot cover 15 can rotate about the shaft 15*a* to take a mounting position (hereinbelow, referred to as a closed position; a position shown with a solid line in FIG. 1) and a spaced position (hereinbelow, referred to as an open position; a position shown with a broken line in FIG. 1). The shoot cover 15 located in the closed position forms a conveyance path W of the sheet P that is conveyed by the conveyance mechanism 4 between the shoot cover and guides 44 to 46 (which will be described later) of the apparatus main body 10. The shoot cover 15 located in the open position does not form the conveyance path W because a part except the lower end portion supported by the shaft 15*a* is apart from the apparatus main body 10.

The feeding cassette 2 is disposed below the recorder 6 in the housing 11. The discharge tray 7 is disposed in front of the recorder 6 in the housing 11 and above the feeding cassette 2. The feeding cassette 2 and the discharge tray 7 can be inserted in the front and rear direction into the housing 11 through an opening 13 provided on a front part of the housing 11. The feeding cassette 2 and the discharge tray 7 mounted to the housing 11 can be removed in the front and rear direction through the opening 13.

The feeding cassette 2 can selectively accommodate any one sheet P of a roll sheet R and a cut sheet K. The roll sheet R has a configuration where a long sheet P is rolled in a roll shape on an outer peripheral surface of a cylindrical winding core (paper tube) Rc. As shown in FIG. 1, the feeding cassette 2 includes a box-shaped tray 21 opened upward, and a support part 22 configured to rotatably support the roll sheet R while supporting an outer peripheral surface of a lower part of the roll sheet R. The cut sheet K is partially supported on the support part 22 or the support part 22 is removed and the cut sheet is entirely disposed on a bottom surface 21*b*1 of the tray 21.

The support part 22 includes a support base 23 and three rollers 24 to 26. The roll sheet R is supported on the support part 22 in a posture where an axis direction thereof is parallel to the right and left direction (a direction orthogonal to the drawing sheet of FIG. 1). The support base 23 is detachably mounted on a bottom part 21*b* of the tray 21. The support base 23 extends in the right and left direction. The rollers 24 to 26 are all rotatably supported on the support base 23 in a posture where axis directions thereof are parallel to the right and left direction.

The support base 23 has a first surface 23*a* that is a horizontal surface facing upward, a second surface 23*b* that is a plane located ahead of (the left in FIG. 1) the first surface 23*a*, and a third surface 23*c* that is a plane located at the rear of (the right in FIG. 1) the first surface 23*a*. The second surface 23*b* is an inclined surface inclined so that a front side is located in a higher position than a rear side, and a rear end thereof connects to the first surface 23*a*. The third surface 23*c* is an inclined surface inclined so that a rear side is located in a higher position than a front side, and a front end thereof connects to the first surface 23*a*.

The roller 24 is disposed at a rear part of the second surface 23*b*. The roller 25 is disposed at a front part of the third surface 23*c*, and the roller 26 is disposed at a rear part of the third surface 23*c*. The rollers 24 and 25 support the roll sheet R from below in a state where they are in contact with the outer peripheral surface of the lower part of the roll sheet R.

The feeder 3 is configured to deliver rearward any one sheet P of the roll sheet R and the cut sheet K accommodated in the feeding cassette 2 from the feeding cassette 2. In a case where the roll sheet R is accommodated in the feeding cassette 2, the feeder 3 delivers rearward the sheet P unrolled (or unwound or pulled out) from the roll sheet R from the feeding cassette 2. Hereinbelow, the expression "unrolled", "unwound" or "pulled out" is collectively referred to as "unrolled".

Figure 2:
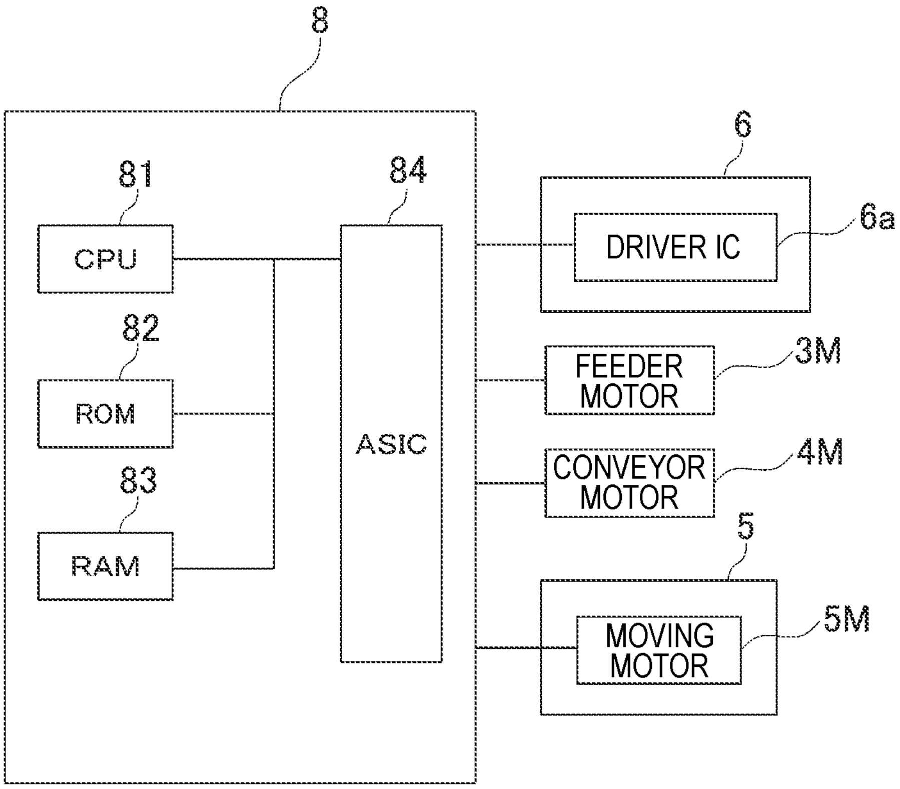
FIG. 2 is a block diagram of a controller of the printer shown in FIG. 1.

The feeder 3 is disposed at the upper of the feeding cassette 2, and mainly includes a feeder roller 3*a*, an arm 3*b* and a feeder motor 3M (refer to FIG. 2). The feeder roller 3*a* is pivotally supported to a tip end of the arm 3*b*. The arm 3*b* is rotatably supported by a support shaft 3*c*. The arm 3*b* is urged by a spring or the like in a direction in which the feeder roller 3*a* is contacted to the bottom surface 21*b*1 of the tray 21. The arm 3*b* is also configured to retreat upward when attaching and detaching the tray 21. The feeder roller 3*a* is configured to rotate as a drive force from the feeder motor 3M is transmitted thereto. When the feeder motor 3M is driven under control of the controller 8, the feeder roller 3*a* is rotated, so that any one sheet P of the roll sheet R and the cut sheet K accommodated in the tray 21 is delivered rearward.

The conveyance mechanism 4 is configured to convey the sheet P fed by the feeder 3 in a conveyance direction orthogonal to the right and left direction, within the housing 11. When the sheet P unrolled from the roll sheet R is fed by the feeder 3, the conveyance mechanism 4 conveys the sheet P in a posture where a width direction of the sheet is parallel to the right and left direction (a direction orthogonal to the conveyance direction).

The conveyance mechanism 4 mainly includes conveying roller pairs 41 to 43, guides 44 to 46 and a conveyor motor 4M (refer to FIG. 2). The three conveying roller pairs 41 to 43 are disposed in corresponding order from an upstream side with respect to the conveyance direction. The conveying roller pair 41 is configured to convey the sheet P that is delivered from the feeding cassette 2 by the feeder 3. The sheet P that is conveyed by the conveying roller pair 41 is first sent upward in a posture where one surface faces rearward and the other surface faces forward, passes through the cut mechanism 5 and is then sent forward. The conveying roller pair 42 is configured to receive the sheet P conveyed by the conveying roller pair 41 and to send the same to the recorder 6. The conveying roller pair 43 is configured to receive and discharge the sheet P conveyed by the conveying roller pair 42. The sheet P conveyed by the conveying roller pairs 42 and 43 is sent forward.

Each of the conveying roller pairs 41 to 43 is configured by a drive roller configured to rotate as a drive force from the conveyor motor 4M is transmitted thereto, and a driven roller configured to rotate in conjunction with the drive roller. When the conveyor motor 4M is driven under control of the controller 8, the drive roller and the driven roller of each of the conveying roller pairs 41 to 43 rotate nipping the sheet P therebetween, so that the sheet P is conveyed in the conveyance direction. The controller 8 is configured to perform control so that a conveying speed of the sheet P by the conveying roller pair 41 is higher than a conveying speed of the sheet P by the conveying roller pair 42. Note that, the sheet P sags between the conveying roller pairs 41 and 42 due to a difference in conveying speed of the sheet P by the conveying roller pairs 41 and 42. The sagging of the sheet P is formed in a space S (refer to FIG. 4) (which will be described later) formed in the conveyance path W.

The three guides 44 to 46 are disposed in corresponding order from an upstream side with respect to the conveyance direction between the conveying roller pair 41 and the conveying roller pair 42 in an area in which the sheet P is conveyed upward. The guide 44 is disposed between the conveying roller pair 41 and the cut mechanism 5. The guides 45 and 46 are disposed on an opposite side to the guide 44 in the upper and lower direction with the cut mechanism 5 being interposed therebetween. The guides 44 to 46 each have a rearward facing surface. As described above, the guides 44 to 46 form the conveyance path W of the sheet P between the guides and the shoot cover 15 located in the closed position. That is, a gap between the guides 44 to 46 and the shoot cover 15 located in a position (closed position) shown with the solid line in FIG. 1 is the conveyance path W of the sheet P that is conveyed by the conveyance mechanism 4.

The cut mechanism 5 is disposed downstream of the conveying roller pair 41 with respect to the conveyance direction. The cut mechanism 5 mainly includes a fixed blade 51, a rotating blade 52 and a moving motor 5M (refer to FIG. 2). The fixed blade 51 extends in the right and left direction (a direction orthogonal to the drawing sheet of FIG. 1). When the shoot cover 15 is located in the closed position (a position shown with the solid line in FIG. 1), the rotating blade 52 is located in a groove 18 formed in a surface (a forward facing surface) of the shoot cover 15 facing the apparatus main body 10, as described later. As described in detail later, the rotating blade 52 is mounted on a carriage 54 (refer to FIG. 4) that can move in the right and left direction.

When the moving motor 5M is driven under control of the controller 8, the carriage 54 that supports the rotating blade 52 can be moved in the right and left direction. At this time, the rotating blade 52 is rotated by friction with the fixed blade 51. Thereby, the fixed blade 51 and the rotating blade 52 cooperate with each other to cut the sheet P unrolled from the roll sheet R in the width direction (a direction orthogonal to the conveyance direction). In this way, a rear end of the sheet P is formed.

The recorder 6 is disposed between the conveying roller pair 42 and the conveying roller pair 43, and mainly includes a recording head 61 and a driver IC 6*a* (refer to FIG. 2). The recording head 61 has a plurality of nozzles (not shown) provided in a lower surface thereof. When the driver IC 6*a* is driven under control of the controller 8, the recording head 61 ejects ink supplied from an ink cartridge (not shown) from the nozzles, thereby recording an image on the sheet P conveyed by the conveying roller pair 42. The sheet P having an image recorded thereon is conveyed forward (the left in FIG. 1) by the conveying roller pair 43. Note that, the recording head 61 may be a line type head configured to eject ink from nozzles in a position fixed state or a serial type head configured to eject ink from nozzles while moving in the right and left direction (a main scanning direction)

The discharge tray 7 is configured to accommodate the sheet P conveyed forward by the conveying roller pair 43. The sheet P accommodated on the discharge tray 7 is any one of a sheet P unrolled from the roll sheet R, and having a rear end formed by the cut mechanism 5 and an image recorded thereon in the recorder 6 and a sheet P having an image recorded on the cut sheet K in the recorder 6.

Subsequently, the controller 8 that is responsible for control for the entire printer 1 is described with reference to FIG. 2. The controller 8 includes a CPU (abbreviation of Central Processing Unit) 81, a ROM (abbreviation of Read Only Memory) 82, a RAM (abbreviation of Random Access Memory) 83, an ASIC (abbreviation of Application Specific Integrated Circuit) 84 and the like that are connected to each other by a bus. They cooperate with each other to control operations of the driver IC 6*a*, the feeder motor 3M, the conveyor motor 4M, the moving motor 5M and the like.

Subsequently, the configurations of the shoot cover 15 and the cut mechanism 5 are described in more details with reference to FIGS. 3 and 4. A surface (forward facing surface) of the shoot cover 15 located in the closed position, which faces the apparatus main body 10, is provided with a plurality of ribs 16 and 17. The conveyance path W is formed between the guides 44 to 46 of the apparatus main body 10 and the ribs 16 and 17 of the shoot cover 15.

Figure 3:
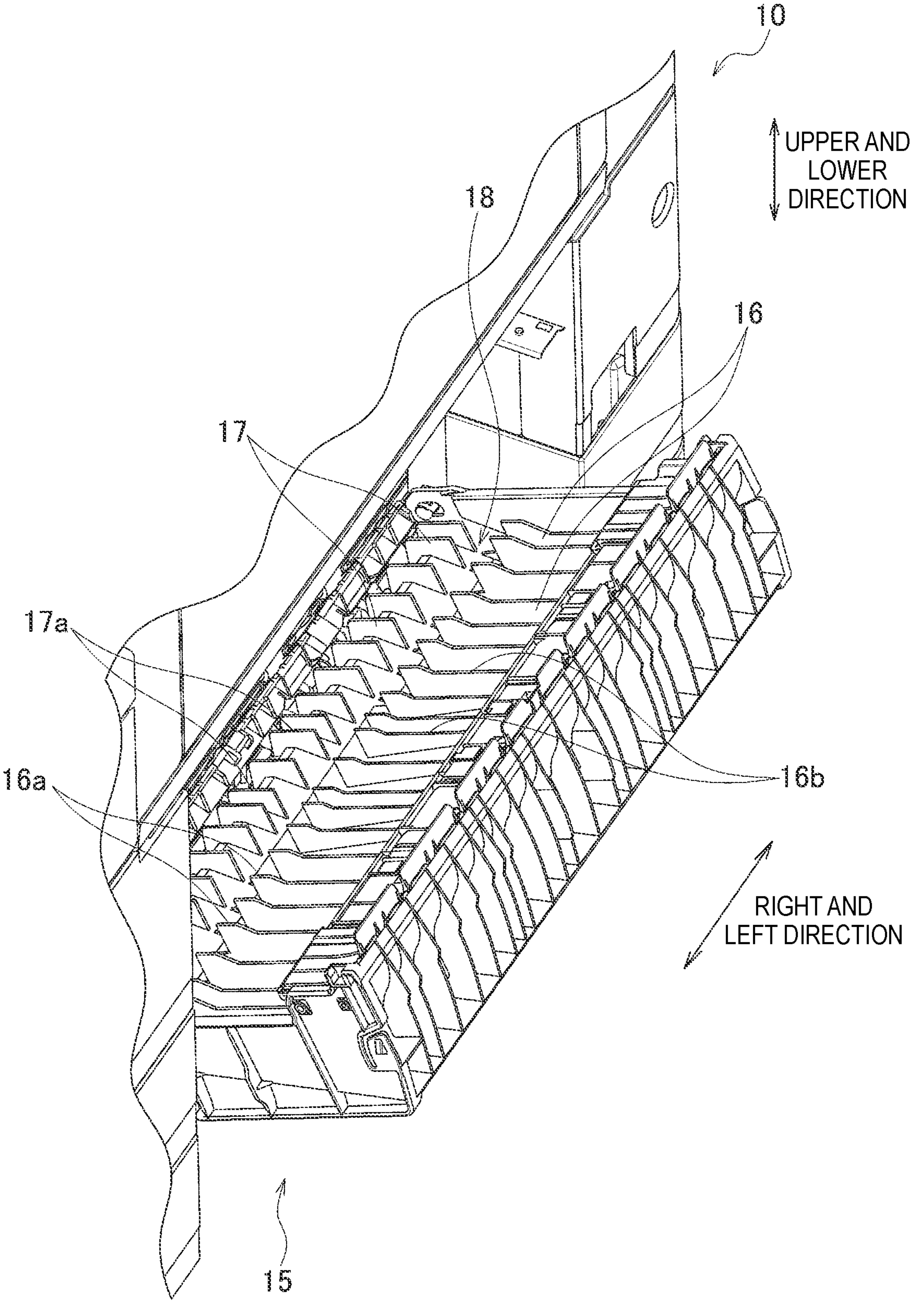
FIG. 3 is a perspective view depicting a detailed configuration of a shoot cover located in an open position.

As shown in FIG. 3, each of the ribs 16 and 17 is a plate-shaped member having a surface orthogonal to the right and left direction. The plurality of ribs 16 is aligned at constant intervals in the right and left direction. The plurality of ribs 17 is also aligned at constant intervals in the right and left direction so that each of the ribs 17 is located at the same position as one rib 16 in the right and left direction. As shown in FIG. 4, the plurality of ribs 16 extends from an upper end portion to a vicinity of a lower end portion of the shoot cover 15 located in the closed position. The plurality of ribs 17 is each disposed apart from a lower end of each of the ribs 16 at a predetermined interval when the shoot cover 15 is located in the closed position. Therefore, a plurality of gaps formed between the plurality of ribs 16 and the plurality of ribs 17 is aligned at constant intervals in the right and left direction. In this way, the plurality of gaps formed between the plurality of ribs 16 and the plurality of ribs 17 is aligned at constant intervals in the right and left direction, so that the surface (forward facing surface) of the shoot cover 15 located in the closed position, which faces the apparatus main body 10, is formed with a groove 18 extending in the right and left direction.

An edge portion (tip end portion) of a lower end portion (an end portion on an upstream side with respect to the conveyance direction) of the rib 16 is configured as a first contact portion 16*a* that can contact a rearward facing surface of the sheet P that is conveyed upward in the conveyance path W by the conveyance mechanism 4. Similarly, an edge portion (tip end portion) of the rib 17 is configured as a first contact portion 17*a* that can contact the rearward facing surface of the sheet P that is conveyed upward in the conveyance path W by the conveyance mechanism 4. The first contact portions 16*a* and 17*a* are each disposed on both sides of the groove 18 with respect to the conveyance direction of the sheet P. The two first contact portions 16*a* and 17*a* are located between the conveying roller pair 41 and the conveying roller pair 42. The two first contact portions 16*a* and 17*a* are located substantially in the same positions in the front and rear direction.

An upper side (a downstream side with respect to the conveyance direction) of the first contact portion 16*a* of the edge portion of the rib 16 is provided with a lead-in portion 16*b* located at the rear of the first contact portion 16*a*. As shown in FIG. 3, the lead-in portions 16*b* provided to each of the plurality of ribs 16 are aligned in the right and left direction. As shown in FIG. 4, a concave space S that is convex in a direction (rear) away from the apparatus main body 10 is formed by the lead-in portions 16*b* provided to each of the plurality of ribs 16 of the shoot cover 15 when located in the closed position. The space S functions as a buffer space in which the sagging of the sheet P generated due to the difference in conveying speed of the sheet P by the conveying roller pairs 41 and 42 is formed, as described above.

Figure 4:
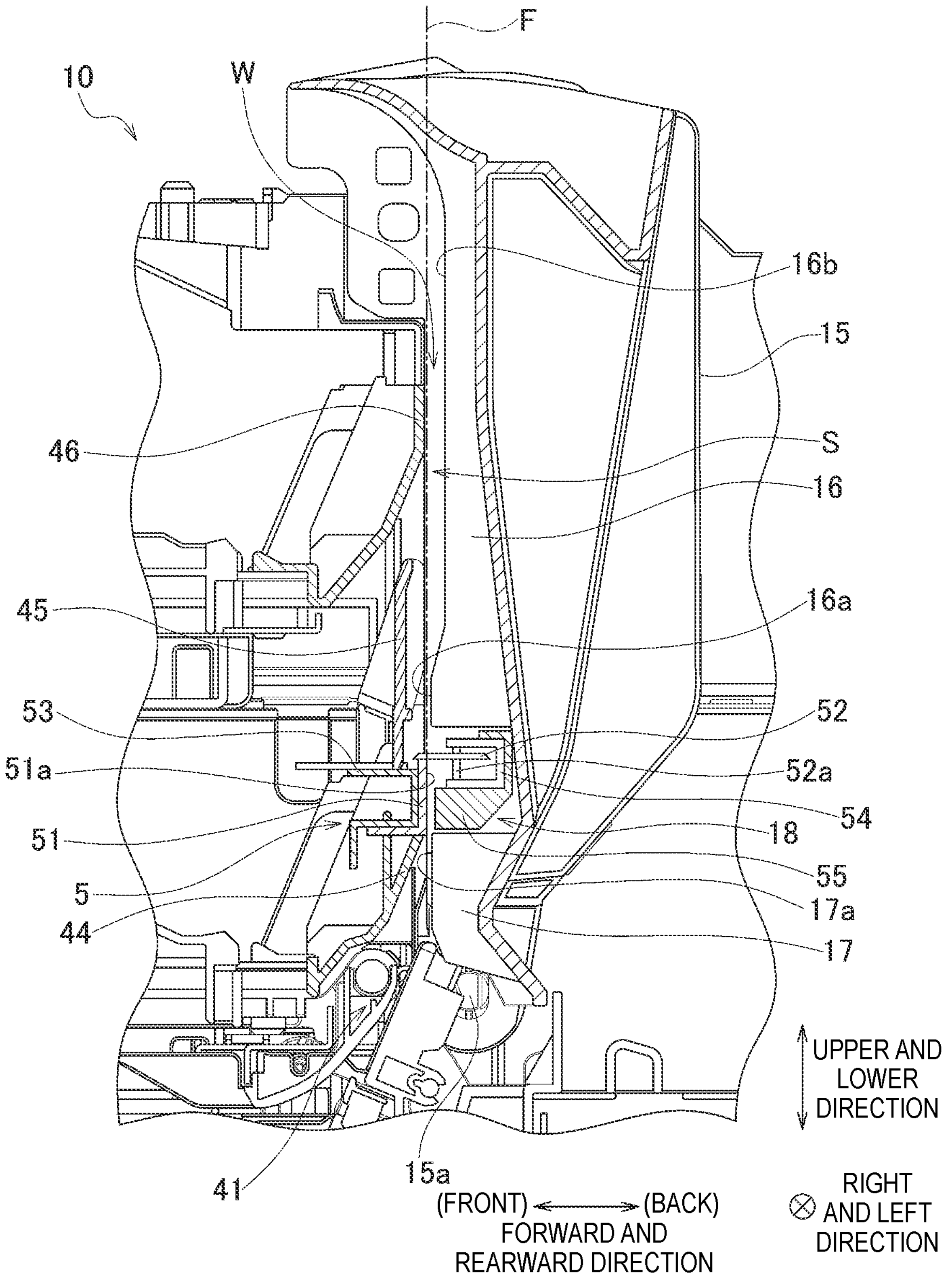
FIG. 4 is a side sectional view depicting detailed configurations of the shoot cover and a cut mechanism.

As shown in FIG. 4, the cut mechanism 5 further includes a frame 53 on which the fixed blade 51 is supported, a carriage 54 on which the rotating blade 52 is mounted, and a guide rail 55 configured to support the carriage 54 so as to be movable in the right and left direction, in addition to the fixed blade 51, the rotating blade 52 and the moving motor 5M (refer to FIG. 2). The compositional elements of the cut mechanism 5 are all mounted to the apparatus main body 10. The cut mechanism 5 is disposed between the two first contact portions 16*a* and 17*a* in the conveyance direction.

The fixed blade 51 supported by the frame 53 is disposed so as to entirely face the groove 18 of the shoot cover 15 located in the closed position in the front and rear direction. The fixed blade 51 has a second contact portion 51*a* that is a rearward facing surface and extends in the right and left direction. The second contact portion 51*a* can contact the forward facing surface of the sheet P that is conveyed upward in the conveyance path W by the conveyance mechanism 4. The two first contact portions 16*a* and 17*a* are located at the rear of a virtual plane F (shown with the dashed-dotted line in FIG. 4) including the second contact portion 51*a*. A distance between the virtual plane F and the two first contact portions 16*a* and 17*a* (a length in the front and rear direction) is substantially the same as a thickness of the thickest sheet P that is handled by the printer 1.

The rotating blade 52, the carriage 54 and the guide rail 55 are located in the groove 18 of the shoot cover 15 when the shoot cover 15 is located in the closed position. The carriage 54 and the guide rail 55 are entirely located in the groove 18 of the shoot cover 15 located in the closed position. The rotating blade 52 has a disc shape, and is mounted to the carriage 54 so as to be rotatable about a shaft 52*a* extending in the upper and lower direction. Only a part of an edge portion of the rotating blade 52 is located outside of the groove 18 of the shoot cover 15 located in the closed position. The cut mechanism 5 is configured so that the fixed blade 51 and the part of the rotating blade 52 located outside of the groove 18 cooperate with each other to cut the sheet P.

The rotating blade 52, the carriage 54 and the guide rail 55 located in the groove 18 of the shoot cover 15 located in the closed position are all mounted to the apparatus main body 10, as described above. Therefore, when the shoot cover 15 is moved from the closed position to the open position, the rotating blade 52, the carriage 54 and the guide rail 55 are exposed through the opening 14.

In the printer 1, the sheet P unrolled from the roll sheet R and delivered from the feeding cassette 2 by the feeder 3 is conveyed upward by the conveyance mechanism 4 in the conveyance path W, which is formed between the guides 44 to 46 of the apparatus main body 10 and the shoot cover 15. Then, the sheet P is cut by the cut mechanism 5 in a state where the rearward facing surface of the sheet P is contacted to the two first contact portions 16*a* and 17*a* provided to the shoot cover 15 and the forward facing surface is contacted to the second contact portion 51*a* of the fixed blade 51. Thereafter, the sheet P is discharged to the discharge tray 7 as being formed with an image by the recorder 6.

As described above, the printer 1 of the present illustrative embodiment includes the apparatus main body 10 to which the conveyance mechanism 4 and the recorder 6 are mounted; the two first contact portions 16*a* and 17*a* disposed in different positions in the conveyance direction of the sheet P that is conveyed by the conveyance mechanism 4 and capable of contacting the rearward facing surface of the sheet P that is conveyed by the conveyance mechanism 4; the cut mechanism 5 disposed between the two first contact portions 16*a* and 17*a* in the conveyance direction, having the second contact portion 51*a* capable of contacting the forward facing surface of the sheet P that is conveyed by the conveyance mechanism 4, and configured so that the fixed blade 51 and the rotating blade 52 cooperate with each other to cut the sheet P in the direction orthogonal to the conveyance direction; and the shoot cover 15 capable of taking the closed position in which the shoot cover forms the conveyance path W of the sheet P that is conveyed by the conveyance mechanism 4 between the shoot cover and the apparatus main body 10 and the open position in which a part except the lower end portion of the shoot cover is apart from the apparatus main body 10 and the conveyance path W is not thus formed. The shoot cover 15 is formed with the groove 18 in a surface that faces the apparatus main body 10 when the shoot cover is located in the closed position, and the rotating blade 52 is located in the groove 18 of the shoot cover 15 when the shoot cover 15 is located in the closed position.

As described above, since the rotating blade 52 of the cut mechanism 5 is located in the groove 18 of the shoot cover 15 when the shoot cover 15 is located in the closed position, the apparatus can be suppressed from being enlarged. Also, the cut mechanism 5 is disposed between the two first contact portions 16*a* and 17*a* capable of contacting the rearward facing surface of the sheet P, and has the second contact portion 51*a* capable of contacting the forward facing surface of the sheet P. That is, the cut mechanism 5 can cut the sheet Pin a state where the sheet is supported at three places by the two first contact portions 16*a* and 17*a* in contact with the rearward facing surface of the sheet P and the second contact portion 51*a* in contact with the forward facing surface of the sheet between the two first contact portions 16*a* and 17*a*. Therefore, the sheet P is difficult to escape during the cutting, so that it is possible to appropriately cut the sheet P.

In the printer 1 of the above-described illustrative embodiment, the conveyance mechanism 4 includes the conveying roller pair 41 and the conveying roller pair 42 configured to receive the sheet P conveyed by the conveying roller pair 41 and to send the same to the recorder 6, and the conveying speed of the sheet P by the conveying roller pair 41 is higher than the conveying speed of the sheet P by the conveying roller pair 42. The two first contact portions 16*a* and 17*a* and the cut mechanism 5 are disposed between the conveying roller pair 41 and the conveying roller pair 42, the two first contact portions 16*a* and 17*a* are provided to the shoot cover 15, and the shoot cover 15 is formed with the concave space S that is convex in the direction away from the apparatus main body 10, at a part that forms the conveyance path W between the conveying roller pair 42 and the first contact portion 16*a*, which is located on a downstream side with respect to the conveyance direction, of the two first contact portions 16*a* and 17*a* when the shoot cover is located in the closed position. Therefore, the sagging of the sheet P generated due to the difference in conveying speed of the sheet P between the conveying roller pair 41 and the conveying roller pair 42 can be formed in the concave space S provided to the shoot cover 15. Thereby, it is possible to increase the conveying accuracy of the sheet P to the recorder 6 by the conveying roller pair 42, thereby increasing a recording quality of an image.

In the printer 1 of the above-described illustrative embodiment, the cut mechanism 5 is mounted to the apparatus main body 10, and the rotating blade 52 is located in the groove 18 provided to the shoot cover 15 located in the closed position. Therefore, when the shoot cover 15 is moved to the open position, the rotating blade 52 can be exposed. Therefore, it is possible to manually move the rotating blade 52 when a trouble occurs, for example. Also, it is possible to easily perform repair and replacement of the rotating blade 52.

In addition, in the printer 1 of the above-described illustrative embodiment, the rearward facing surface of the fixed blade 51 is the second contact portion 51*a*. Therefore, since the fixed blade 51 also serves as the second contact portion 51*a*, it is not necessary to separately provide the second contact portion 51*a*, which facilitates design and assembling.

Also, in the printer 1 of the above-described illustrative embodiment, the surface of the shoot cover 15 that faces the apparatus main body 10 when the shoot cover is located in the closed position is provided with the plurality of ribs 16 and 17, and the two first contact portions 16*a* and 17*a* are the tip end portions of the ribs 16 and 17. Therefore, since the tip end portions of the ribs 16 and 17 provided to the shoot cover 15 function as the first contact portions 16*a* and 17*a*, is not necessary to separately provide the first contact portions 16*a* and 17*a*, which facilitates assembling.

Although the illustrative embodiment of the present invention has been described with reference to the drawings, the specific configurations are not construed as being limited to the illustrative embodiment. The scope of the present invention is defined by the claims, not the descriptions of the illustrative embodiment, and includes all changes within the meaning and range equivalent to the claims.

In the above illustrative embodiment, the cut mechanism 5 rotates the rotating blade 52 while moving the carriage 54 that supports the rotating blade 52 in the right and left direction, so that the fixed blade 51 and the rotating blade 52 cooperate with each other to cut the sheet P. However, the configuration of the cut mechanism 5 is not limited thereto. For example, instead of the rotating blade 52, a movable blade configured to move in the right and left direction without rotating may also be adopted. Also, the two movable blades may be configured to cut the sheet P in cooperation with each other, without adopting the fixed blade 51.

In the above illustrative embodiment, the lower end portion of the shoot cover 15 is rotatably supported by the shaft 15*a*, and the part except the lower end portion is apart from the apparatus main body 10 when the shoot cover is located in the open position. However, the present disclosure is not limited thereto. For example, an upper end portion, a side part or the like of the shoot cover 15, not the lower end portion, may be rotatably supported by a shaft. Also, the shoot cover 15 may be configured to be removable from the apparatus main body 10.

In the above illustrative embodiment, the shoot cover 15 is formed with the concave space S that is convex in the direction away from the apparatus main body 10, at the part that forms the conveyance path W between the first contact portion 16*a* and the conveying roller pair 42. However, the present disclosure is not limited thereto. That is, for example, the concave space S that is convex in the direction away from the apparatus main body 10 may also be formed at a part that forms the conveyance path W of the apparatus main body 10. Also, the space S may not be formed.

In the above illustrative embodiment, the rotating blade 52 is located in the groove 18 provided to the shoot cover 15 located in the closed position. However, the present disclosure is not limited thereto. That is, the fixed blade 51 may be located in the groove 18.

In the above illustrative embodiment, the rearward facing surface of the fixed blade 51 is the second contact portion 51*a*. However, the present disclosure is not limited thereto. That is, for example, in a case where not the fixed blade 51 but the rotating blade 52 is located outside of the groove 18, a rearward facing surface of the guide rail 55 configured to movably support the carriage 54 to which the rotating blade 52 is mounted may be configured to function as the second contact portion 51*a*.

In the above illustrative embodiment, the first contact portions 16*a* and 17*a* are the tip end portions of the ribs 16 and 17 provided to the shoot cover 15. However, the present disclosure is not limited thereto. For example, the first contact portions 16*a* and 17*a* may also be provided to portions other than the ribs 16 and 17 of the shoot cover 15. Also, the first contact portions 16*a* and 17*a* may be provided to the apparatus main body 10. In this case, the second contact portion 51*a* may be provided to the shoot cover 15, and the forward facing surface of the guide rail 55 configured to movably support the carriage 54 to which the rotating blade 52 disposed in the groove 18 is mounted may be configured to function as the second contact portion 51*a*. Also, in a case where the fixed blade 51 is disposed in the groove 18, a forward facing surface of the fixed blade 51 may be configured to function as the second contact portion 51*a*.

In the above illustrative embodiment, all the elements configuring the cut mechanism 5 are mounted to the apparatus main body 10. However, the present disclosure is not limited thereto. That is, for example, some of the elements configuring the cut mechanism 5, such as the rotating blade 52, may be mounted to the shoot cover 15.

In the above illustrative embodiment, the two first contact portions 16*a* and 17*a* are located at the rear of the virtual plane F including the second contact portion 51*a*. However, the present disclosure is not limited thereto. That is, the two first contact portions 16*a* and 17*a* may be located at the same positions as the virtual plane F or may be located in front of the virtual plane F.

In the above illustrative embodiment, the sheet P is exemplified as the sheet-like recording medium. However, the present disclosure is not limited thereto. For example, a fabric may be used as the sheet-like recording medium. The feeding cassette 2 may accommodate a fabric roll.

The present invention is not limited to the inkjet printer, and can also be applied to all recording apparatuses including the cut mechanism, such as a laser printer, a thermal printer, a FAX machine, and the like.

What is claimed is:

1. A recording apparatus comprising:
- an apparatus main body;
- a recorder mounted to the apparatus main body and configured to record an image on a recording medium;
- two first portions disposed in different positions in a conveyance direction of the recording medium and forming a conveyance path of the recording medium, the two first portions facing one surface of the recording medium being conveyed along the conveyance path;
- a cut mechanism configured to cut the recording medium, the cut mechanism comprising
- a first blade disposed between the two first portions in the conveyance direction;
- a second portion forming the conveyance path of the recording medium, the second portion facing the other surface of the recording medium being conveyed along the conveyance path;
- a conveyance mechanism mounted to the apparatus main body and configured to convey the recording medium, the conveyance mechanism comprising:
  - a first roller configured to convey the recording medium; and
  - a second roller pair downstream of the first roller and upstream of the recorder in the conveyance direction, the second roller pair configured receive the recording medium conveyed by the first roller and to convey the recording medium to the recorder; and
- a cover openable and closeable with respect to the apparatus main body, the cover having an exterior surface,
- wherein the two first portions and the cut mechanism are disposed between the first roller and the second roller pair in the conveyance direction; and
- wherein, when the cover is closed, the two first portions are between the exterior surface of the cover and the second portion in a direction orthogonal to the conveyance direction.

2. The recording apparatus according to claim 1, wherein the second portion is disposed upstream of the first blade in the conveyance direction.

3. The recording apparatus according to claim 1, wherein the first blade is disposed upstream of the recorder in the conveyance direction.

4. The recording apparatus according to claim 1, wherein the first blade is overlapped with the two first portions in the conveyance direction.

5. The recording apparatus according to claim 1, wherein the first blade is overlapped with the second portion in the conveyance direction.

6. The recording apparatus according to claim 1,
- wherein the first blade is replaceable when the cover is opened.

7. The recording apparatus according to claim 1,
- wherein the cut mechanism further comprises a second blade, at least one of the first blade and the second blade being a movable blade, and
- wherein the cut mechanism is configured to cut the recording medium in a direction intersecting with the conveyance direction by the first blade and the second blade being cooperated with each other.

8. The recording apparatus according to claim 1, further comprising: a cover wherein
- when the cover is closed, the cover forming a portion of the conveyance path of the recording medium between the cover and the apparatus main body, and
- when the cover is opened at least a part of the cover being apart from the apparatus main body and the portion of the conveyance path being not formed.

9. The recording apparatus according to claim 8,
- wherein the cover is formed with a groove in a surf ace that faces the apparatus main body when the cover is closed, and
- wherein the first blade is located in the groove of the cover when the cover is closed.

10. The recording apparatus according to claim 1, wherein the first roller is configured to convey the recording medium at a first conveyance speed; and
- the second roller pair is configured to convey the recording medium to the recorder at a second conveyance speed, the first conveyance speed being higher than the second conveyance speed,
- wherein the cover has the two first portions, and
- wherein the cover is formed with a concave space that is convex in a direction away from the apparatus main body, the concave space being formed at a part between the second roller pair and one of the two first portions on the conveyance path, said one of the two first contact portions being located downstream of the other one of the two first portions in the conveyance direction when the cover is closed.

11. The recording apparatus according to claim 1, wherein the first blade is a movable blade and is mounted to the apparatus main body.

12. The recording apparatus according to claim 7, wherein any one of the first blade and the second blade is a fixed blade and also serves as the second portion.

13. The recording apparatus according to claim 6,
- wherein the cover is provided with a plurality of ribs on the surface that faces the apparatus main body, and
- wherein the two first portions are tip end portions of the ribs.

14. The recording apparatus according to claim 1, wherein the first roller includes a feeder roller for conveying the recording medium from a holder.

15. The recording apparatus according to claim 1, wherein the first roller includes a first roller pair.

16. The recording apparatus according to claim 11, wherein the first roller extends in an extending direction which intersects the conveyance direction, wherein the movable blade is movable in the extending direction.

17. The recording apparatus according to claim 11, wherein the movable blade is a rotary blade.

* * * * *